US008046365B2

(12) United States Patent
Saito

(10) Patent No.: US 8,046,365 B2
(45) Date of Patent: Oct. 25, 2011

(54) DOCUMENT MANAGEMENT APPARATUS AND DOCUMENT MANAGEMENT METHOD

(75) Inventor: Shigemi Saito, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 202 days.

(21) Appl. No.: 11/685,001

(22) Filed: Mar. 12, 2007

(65) Prior Publication Data
US 2007/0226174 A1 Sep. 27, 2007

(30) Foreign Application Priority Data

Mar. 24, 2006 (JP) .................................. 2006-082138

(51) Int. Cl.
*G06F 7/00* (2006.01)
*G06F 17/00* (2006.01)
*G06F 17/30* (2006.01)

(52) U.S. Cl. .................... 707/741; 707/673; 707/696

(58) Field of Classification Search .............. 707/9, 1–5, 707/10, 100, 781, 999.001–999.005, 999.1, 707/999.01, 673, 696, 741
See application file for complete search history.

(56) References Cited

U.S. PATENT DOCUMENTS

| 6,006,228 | A  | * | 12/1999 | McCollum et al. ..... 707/999.001 |
| 6,314,425 | B1 | * | 11/2001 | Serbinis et al. .......... 707/999.01 |
| 6,516,337 | B1 | * | 2/2003  | Tripp et al. ............ 707/999.104 |
| 6,622,248 | B1 | * | 9/2003  | Hirai ...................... 707/E17.058 |
| 7,010,580 | B1 | * | 3/2006  | Fu et al. ................ 707/999.104 |
| 7,263,528 | B2 | * | 8/2007  | Haff et al. ...................... 707/622 |
| 2001/0027451 | A1 | * | 10/2001 | Taguchi et al. ..................... 707/3 |
| 2002/0002468 | A1 | * | 1/2002  | Spagna et al. ..................... 705/1 |
| 2002/0174355 | A1 | * | 11/2002 | Rajasekaran et al. ......... 713/193 |
| 2003/0007637 | A1 | * | 1/2003  | Banks ................................. 380/51 |
| 2004/0143649 | A1 | * | 7/2004  | Feng et al. ...................... 709/219 |
| 2004/0205042 | A1 | * | 10/2004 | Ritter et al. ........................ 707/2 |
| 2005/0193211 | A1 | * | 9/2005  | Kurose ........................... 713/185 |
| 2006/0080316 | A1 | * | 4/2006  | Gilmore et al. .................. 707/9 |
| 2006/0265762 | A1 | * | 11/2006 | Morisawa ....................... 726/27 |
| 2007/0005595 | A1 | * | 1/2007  | Gafter ............................... 707/6 |

(Continued)

FOREIGN PATENT DOCUMENTS

| JP | 2005-085113 A | 3/2005 |
| JP | 2005-085113 A | 3/2005 |

OTHER PUBLICATIONS

Damiani, E., S. De Capitani di Vimercati, S. Foresti, S. Jajodia, S. Paraboschi and P. Samarati, Key management for multiuser encrypted databases, in: Proc. of the International Workshop on Storage Security and Survivability, Fairfax Virginia, USA, 2005.*

(Continued)

*Primary Examiner* — Mohammad Ali
*Assistant Examiner* — Kannan Shanmugasundaram
(74) *Attorney, Agent, or Firm* — Canon USA Inc. IP Division

(57) ABSTRACT

An apparatus stores one or more document information of which access right is managed by an access right management apparatus, and generates an index of stored document information. The apparatus receives user identification information, and sends the user identification information, and information for identifying document information of which index has not been generated to the access right management apparatus. The apparatus receives access right information associated with the user from the access right management apparatus, and generates index of the identified document information based on the received access right information.

6 Claims, 10 Drawing Sheets

1108

| 31 | 32 | 33 | 34 | 35 | 36 | 37 | 38 |
|---|---|---|---|---|---|---|---|
| DOCUMENT ID | PARENT FOLDER ID | DOCUMENT NAME | ACCESS RIGHT ADMINISTRATOR | ACCESS RIGHT ID | POLICY MANAGEMENT SERVER INFORMATION | POLICY ID | FULL TEXT SEARCH INFORMATION REGISTRATION STATUS |
| 1 | 1 | DOCUMENT 1 | DOCUMENT MANAGEMENT SYSTEM | 1 | — | — | REGISTERED |
| 2 | 1 | DOCUMENT 2 | POLICY MANAGEMENT SERVER | — | 192.168.0.100 | 3 | UNREGISTERED |
| 3 | 2 | DOCUMENT 3 | POLICY MANAGEMENT SERVER | — | 192.168.0.200 | 4 | REGISTERED |

U.S. PATENT DOCUMENTS

2007/0016583 A1 * 1/2007 Lempel et al. .................. 707/9

OTHER PUBLICATIONS ksDawn Xiaoding Song; Wagner, D.; Perrig, A.; , "Practical techniques for searches on encrypted data," Security and Privacy, 2000. S&P 2000. Proceedings. 2000 IEEE Symposium on , vol., No., pp. 44-55, 2000.*

Waters, B.R., Balfanz, D., Durfee, G., Smetters, D.K.: Building an encrypted and searchable audit log. In: Proceedings of Network and Distributed System Security Symposium 2004 (NDSS'04), San Diego, CA (Feb. 2004).*

* cited by examiner

| DOCUMENT ID 31 | PARENT FOLDER ID 32 | DOCUMENT NAME 33 | ACCESS RIGHT ADMINISTRATOR 34 | ACCESS RIGHT ID 35 | POLICY MANAGEMENT SERVER INFORMATION 36 | POLICY ID 37 | FULL-TEXT SEARCH INFORMATION REGISTRATION STATUS 38 |
|---|---|---|---|---|---|---|---|
| 1 | 1 | DOCUMENT 1 | DOCUMENT MANAGEMENT SYSTEM | 1 | — | — | REGISTERED |
| 2 | 1 | DOCUMENT 2 | POLICY MANAGEMENT SERVER | — | 192.168.0.100 | 3 | UNREGISTERED |
| 3 | 2 | DOCUMENT 3 | POLICY MANAGEMENT SERVER | — | 192.168.0.200 | 4 | REGISTERED |

| ACCESS RIGHT ID (41) | USER ID (42) | ACCESS RIGHT (43) |
|---|---|---|
| 1 | 1 | DELETION RIGHT |
| 1 | 2 | READING RIGHT |
| 1 | 3 | WRITING RIGHT |
| 2 | 1 | WRITING RIGHT |
| 3 | 2 | READING RIGHT |

| USER ID (51) | POLICY MANAGEMENT SERVER INFORMATION (52) | POLICY ID (53) | ACCESS RIGHT (54) |
|---|---|---|---|
| 1 | 192. 168. 0. 100 | 3 | NONE |
| 1 | 192. 168. 0. 100 | 7 | REFERENCE RIGHT |
| 1 | 192. 168. 0. 200 | 11 | READING RIGHT |
| 2 | 192. 168. 0. 100 | 3 | WRITING RIGHT |
| 3 | 192. 168. 0. 100 | 3 | DELETION RIGHT |

FIG. 6

| USER ID 61 | POLICY MANAGEMENT SERVER INFORMATION 62 | AUTHENTICATION INFORMATION 63 | CREDENTIAL 64 | USER NAME 65 | PASSWORD 66 | EXPIRATION DATE 67 |
|---|---|---|---|---|---|---|
| 1 | 192.168.0.100 | UNAUTHENTICATED | — | — | — | — |
| 1 | 192.168.0.200 | CREDENTIAL | fajdhfauh343fafd95 | — | — | — |
| 2 | 192.168.0.100 | PASSWORD | — | taro | taro1 | 6/20 18:00 |
| 2 | 192.168.0.200 | UNAUTHENTICATED | — | — | — | — |

| USER ID | FULL-TEXT SEARCH INFORMATION OBTAINING PERMISSION RANGE | PERMISSION RANGE |
|---|---|---|
| 1 | ALL PERMITTED | — |
| 2 | PARTIALLY PERMITTED | 1, 4, 7, 9 |
| 3 | ALL DENIED | — |

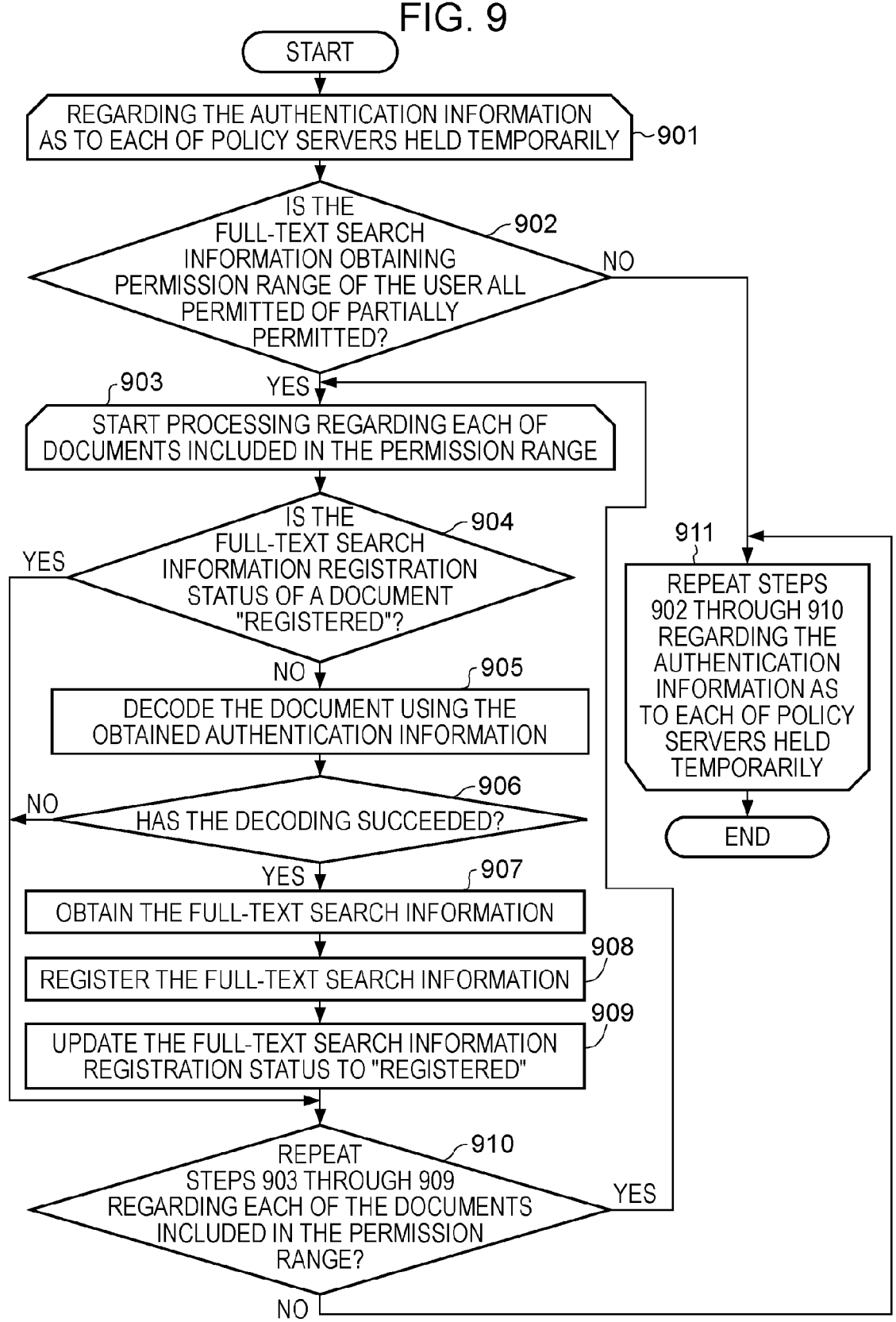

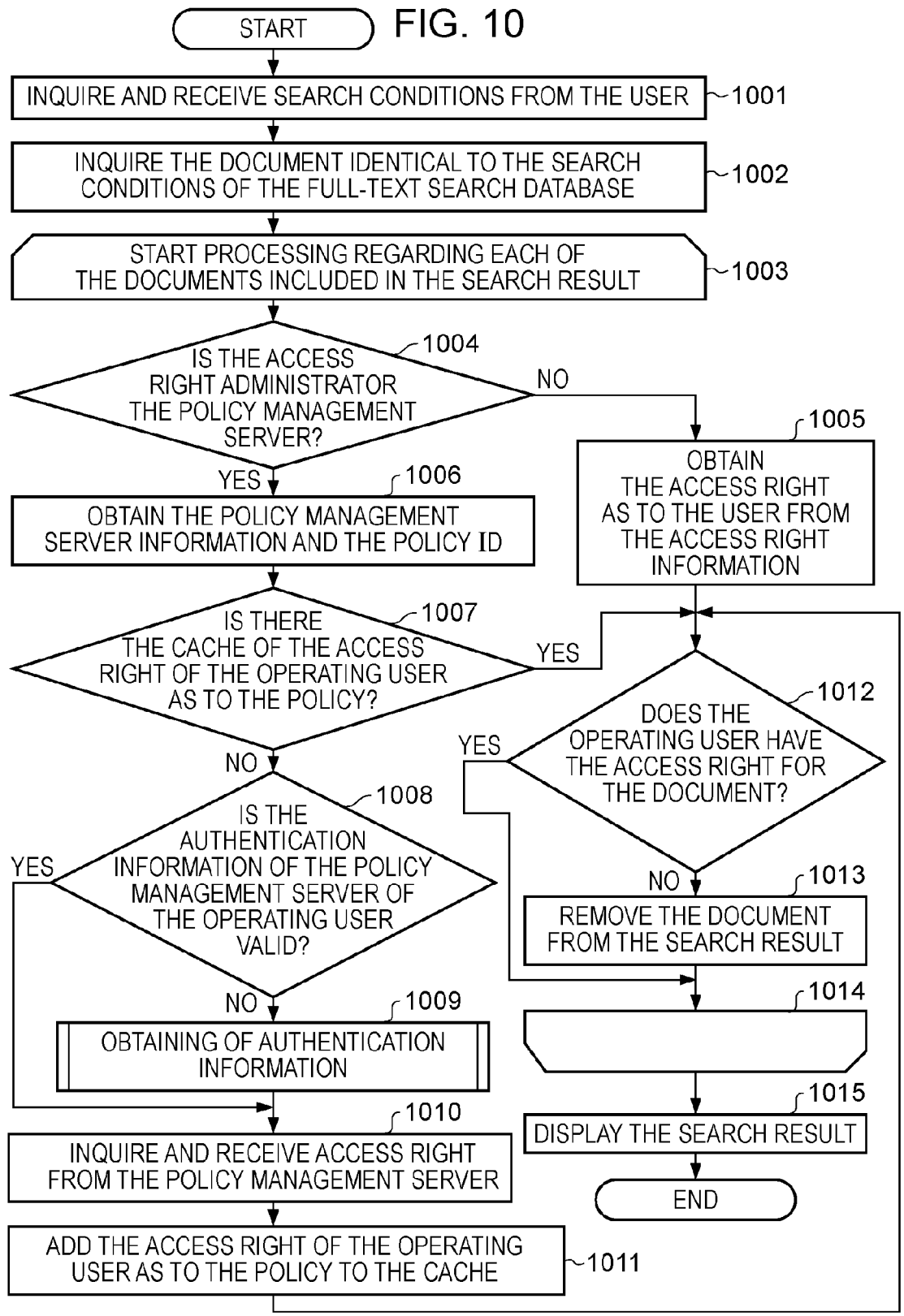

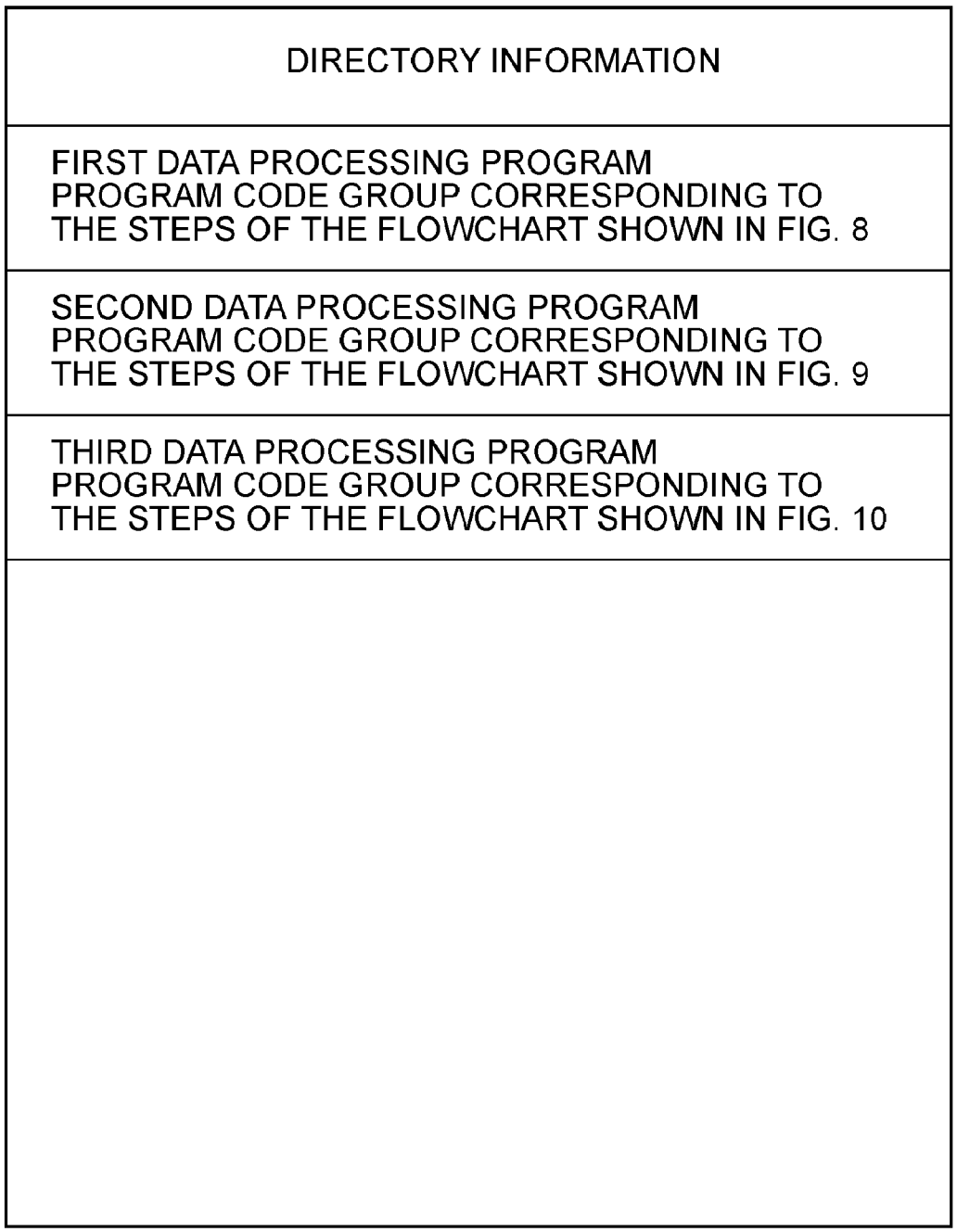

DOCUMENT MANAGEMENT APPARATUS AND DOCUMENT MANAGEMENT METHOD

BACKGROUND OF THE INVENTION

1. Field of the Invention

The present invention relates to document management processing of a document management apparatus which communicates with a server device controlling access right, and controls a document processing request requested from a client device.

2. Description of the Related Art

Document management systems which include storage devices storing document information, and perform document search and document registration processing from a client device via a network have been realized.

With a document management system, access right as to each of documents is set for each user, and when accessing a document, the access right of a user as to the document is determined, whereby operations of the user are allowed or denied based on the determination result. Examples of the access right mentioned here include a reference right, a reading right, a writing right, and a deletion right.

Also, a set of one or more combinations of a user and an access right is referred to as a policy, and there is a technique for reducing complications associated with setting an access right by applying a policy to a document.

Also, there is a technique for listing the documents of multiple document servers as well as the access rights thereof (e.g., Japanese Patent Laid-Open No. 2005-085113).

Japanese Patent Laid-Open No. 2005-085113 discloses listing the search results crossing multiple document servers as well as the access rights thereof. Additionally, Japanese Patent Laid-Open No. 2005-085113 refers to a search program for confirming the access right of a document included in the search results by inquiring of a document server managing the document thereof.

The access right management using a document management system is only valid as to the documents within the document management system, and a technique such as the following is employed regarding the documents outside the document management system.

That is to say, this is a technique wherein a document is encrypted, authentication is performed when accessing the document to confirm the access right thereof, following which the document is decoded.

Such authentication or authorization (access right management) is frequently performed as to a dedicated server outside of the document management system. The access right management at this dedicated server is frequently performed employing the above described policy, so such a dedicated server is referred to as a policy management server below.

The system realizing the access right management employing such a policy management server is referred to as a Rights Management System (RMS). A document of which the access right is managed with RMS can be stored in the document management system.

However, with existing document management systems (including a document management system made up of multiple servers described in Japanese Patent Laid-Open No. 2005-085113), the documents of which access rights are managed with the RMS are encrypted. Therefore, full-text search information has not been able to be obtained.

Also, regardless of full-text search or attribute search, the search results are presented to a user without determining the access right as to a document included in the search results.

Therefore, it is difficult for the user to readily confirm the documents that he/she can access, so it is necessary for the user to confirm his/her access right by accessing each of documents, and inquiring of a policy management server whether or not the user can access the document, which is poor in convenience.

Also, in the event of presenting the result of full-text search to the user, though only the key words employed for search, a user is informed about the contents of a document which should be kept in secret by access restriction to begin with, which causes a problem even from the perspective of security.

SUMMARY OF THE INVENTION

Embodiments of the present invention are provided to solve or at least mitigate the above mentioned problems. An embodiment of the present invention provides an arrangement wherein even if document information of which access right is set is encrypted and stored, decoding can be performed in accordance with user authority, and also full-text search can be performed with sufficient convenience.

According to an aspect of the present invention, an embodiment is directed to a document management apparatus including: a document information storing unit configured to store one or more document information of which access right is managed by an access right management apparatus; an index generating unit configured to perform processing for generating an index of document information stored in the document information storing unit; a sending unit configured to accept user identification information for identifying a user, and send to the access right management apparatus the user identification information, and information for determining document information of which index generating processing has not been performed by the index generating unit, of the document information stored in the document information storing unit; a receiving unit configured to receive the access right information of the user regarding the document information to be sent from the access right management apparatus which responds to the user identification information and the document information sent by the sending unit; and a control unit configured to control the index generating processing of the document information by the index generating unit based on access right information received by the receiving unit.

According to another aspect of the present invention, an embodiment is directed to a method for a document management apparatus having a document information storing unit capable of storing one or more document information of which access right is managed by an access right management apparatus. The method includes: performing processing for generating an index of document information stored in the document information storing unit; receiving user identification information for identifying a user, and sending to the access right management apparatus the user identification information, and information for identifying document information of which index generating processing has not been performed, of the document information stored in the document information storing unit; receiving the access right information of the user regarding the document information to be sent from the access right management apparatus which responds to the user identification information and the information identifying the document information; and controlling the index generating processing of the document information based on the received access right information.

Further features of the present invention will become apparent from the following description of exemplary embodiments with reference to the attached drawings.

BRIEF DESCRIPTION OF THE DRAWINGS

FIG. 3 is a diagram showing an example of the document attribute information stored in the attribute database illustrated in FIG. 1.

FIG. 4 is a diagram showing one example of the access right information stored in the attribute database illustrated in FIG. 1.

FIG. 5 is a diagram showing one example of the cache of the policy information of the policy management server stored in the attribute database illustrated in FIG. 1.

FIG. 6 is a diagram showing one example of the authentication information as to the policy management server saved in the temporary data illustrated in FIG. 1.

FIG. 7 is a diagram showing an example of a full-text search information obtaining range for each user saved in the attribute database illustrated in FIG. 1.

FIG. 9 is a flowchart illustrating one example of a second data processing procedure executed in the document management apparatus according to an embodiment.

FIG. 10 is a flowchart illustrating one example of a third data processing procedure executed in the document management apparatus according to an embodiment.

FIG. 11 is a diagram illustrating the memory map of a storing medium storing various types of data processing programs which can be read by the document management apparatus according to an embodiment of the present invention.

DESCRIPTION OF THE EMBODIMENTS

Next, description will be made regarding the preferred embodiments for implementing the present invention with reference to the drawings.
<Description of System Configuration>

First Embodiment

Figure 1:
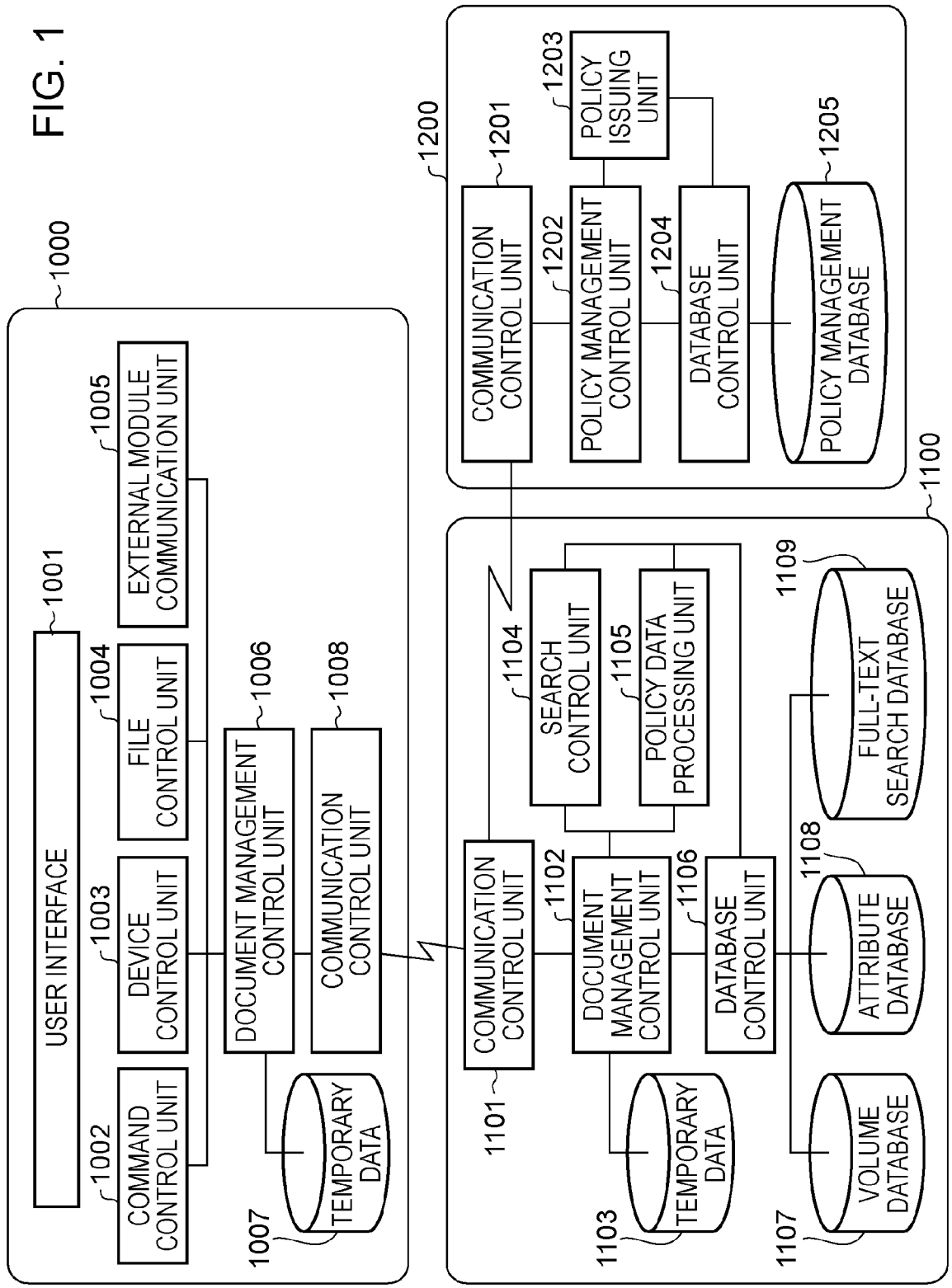
FIG. 1 is a block diagram showing a document management system according to a first embodiment of the present invention.

FIG. 1 is a block diagram showing a document management system according to a first embodiment of the present invention. In the illustrated embodiment, the document management system includes a client 1000, a document server 1100 serving as a document management apparatus, and a policy management server 1200.

Now, the policy management server 1200, separately from the document management system, performs processing for controlling and issuing control data called "policy" for performing access control as to a document (also referred to herein as document information). In one context, the term "policy" is used to describe a set of one or more combinations of a user and an access right.

The document management system according to an embodiment includes the client 1000 which runs on the operating system (OS) of a personal computer, and the document server 1100. The document management system executes processing wherein a document is obtained from an image input device such as a scanner, or a file on the OS, and the document is managed by multiple users.
<Document Input/Output Processing Unit>

First, description will be made regarding a processing unit for performing input/output or operations of a document disposed within the client 1000.

The client 1000 includes a control unit including CPU, ROM, and RAM as the base, a keyboard, a pointing device, and a display device as an input/output device, and further an external device such as a hard disk or the like.

The CPU loads the OS stored in the external device into the RAM, and performs device processing, and processing such as activation and termination of software. Note that the document server 1100 also has similar hardware resources.

Also, the client 1000 and the document server 1100 each include a network controller for communicating via a network, which is configured so as to communicate with multiple protocols.

In FIG. 1, reference numeral 1001 denotes a user interface unit. A user performs operations via the user interface unit 1001, such as registration of a document to the document server 1100, obtaining of a document from the document server 1100, or search of a document.

The information (e.g., command) entered via the user interface unit 1001 is analyzed at a command control unit 1002, where appropriate processing is performed. Also, commands for communicating with the document server 1100 are generated by the command control unit 1002.

A device control unit 1003 performs control of a device such as a scanner or the like. Here, processing such as uploading document data from the device side, or receiving data transmitted from the device side is performed.

A document file saved on the OS such as a file server or the like is configured so as to perform input processing at a file control unit 1004 in a form of importing document data. The file control unit 1004 also performs processing for exporting a file managed upon the document server 1100 to the OS.

Reference numeral 1005 denotes an external module communication unit, which performs communication with an external application, and performs processing such as transmitting a document within the document server 1100 to an external application, receiving a document from an external application, and so forth. An external application is another application installed into the client 1000. The external module communication unit 1005 performs processing such as transmitting a document managed at the document server 1100 to an electric mail application corresponding to MAPI (Messaging Application Programming Interface), for example.
<Interior of Client 1000>

Next, description will be made regarding other components disposed within the client 1000.

Reference numeral 1006 denotes a document management control unit, which is a functional processing unit for controlling the document management processing at the client 1000. Here, processing corresponding to a file or command transmitted from the input/output processing unit is performed.

Reference numeral 1007 denotes an internal data saving unit, which saves temporary data. The internal data saving unit 1007 temporarily saves data created at a process for performing image processing, data created at a process for communication with the server, and so forth. The internal data saving unit 1007 substantively comprises memory devices such as a hard disk, RAM, and so forth, and access to the memory devices is controlled by the CPU via the OS.

Reference numeral 1008 denotes a communication control unit, which performs control for communicating with the document server 1100 or the policy management server 1200 using a predetermined protocol.

The communication control unit 1008 shown in the present embodiment performs control with the processing of the document server 1100 or the policy management server 1200, and with regard to control of communication such as TCP/IP or the like serving as a protocol, the control prepared by the OS is employed.

<Interior of Document Server 1100>

Next, description will be made regarding various types of processing units disposed within the document server 1100.

Reference numeral 1101 denotes a communication control unit, which performs control for communicating with the communication control unit 1008 of the client 1000.

However, the communication control unit 1101 of the document server 1100 is configured so as to communicate with the communication control units 1008 of a great number of clients simultaneously. With the present embodiment, in FIG. 1, an example is illustrated wherein the one client 1000 can communicate with the document server 1100, but the system can be configured so as to communicate with multiple clients.

Reference numeral 1102 denotes a document management control unit, which integrally controls the processing at the document server 1100 side in accordance with an instruction from the client 1000.

The document management control unit 1102, as a result of authentication as to the policy management server 1200, encrypts the document information obtained from the client 1000, registers this in a later-described volume database 1107, and manages this.

Also, in the event that an access right is determined at later-described processing, the document management control unit 1102 subjects the document information encrypted and registered in the volume database 1107 to decoding processing based on the stored authentication information. Alternatively, the document management control unit 1102 subjects the encrypted document to decoding processing based on the information obtained from the policy management server 1200.

Reference numeral 1103 denotes an internal data saving unit, which saves temporary data. The internal data saving unit 1103 temporarily saves data created at a process of communication with the client 1000.

Reference numeral 1104 denotes a search control unit, which performs processing for searching the document requested from the client 1000, or performs the search information registration processing of the registered document.

Reference numeral 1105 denotes a policy data processing unit. The policy data processing unit 1105 performs processing for determining whether or not policy data appended to a document exists, or transmitting policy data to the policy management server 1200 to confirm the contents of the policy.

With the policy data processing unit 1105, user authentication information is requested to the client 1000, and is obtained from the client 1000, the authentication of the relevant user is performed, and the authority information (including an authority list) regarding the document information of the authenticated user is obtained from the policy management server 1200.

Also, the policy data processing unit 1105 processes an available authority list received from the policy management server 1200, and returns the confirmation result of the policy and so forth to the document control unit 1102. Note that the authority list and so forth are stored in the internal data saving unit 1103, and the user authentication information and so forth stored by the document control unit 1102 are removed based on the authentication result or the authority determining processing.

The policy data processing unit 1105 is configured depending on the specifications of the policy management server 1200.

<Database Processing Unit>

Next, description will be made regarding a database processing unit disposed within the document server 1100.

Reference numeral 1106 denotes a database control unit, which performs processing wherein data to be saved in a database is created, and the corresponding document is saved in a volume database 1107, an attribute database 1108, and a full-text search database 1109.

Also, the database control unit 1106 performs processing wherein data is extracted from each of the above databases depending on a request from the client 1000, and a document to be transmitted to the client 1000 is created.

Reference numeral 1107 denotes a volume database, which is a database to which the entity of a document is saved. The volume database 1107 is a conceptual database, so there is no problem even if the entity is the file system of the OS.

Reference numeral 1108 denotes an attribute database, which is a database where information relating to attributes such as a document name, created date, remarks, and so forth is saved. Also, an access right administrator for each document, an access right ID, policy management server information, policy ID, and the cache of the access right information of the RMS, are also saved in the attribute database 1108.

Reference numeral 1109 denotes a full-text search database, which extracts text data from a document registered in the volume database 1107, and the data converted into index information is registered therein.

Upon receiving a full-text search request from the client 1000, the document management control unit 1102 searches the full-text search database 1109 based on the search conditions received from the client 1000. Here, as for the search conditions, various types of data such as a keyword, date and time, a title, an image name, and so forth can be specified as search conditions.

<Policy Management Server 1200>

Next, description will be made regarding a policy management processing unit disposed within the policy management server 1200.

Reference numeral 1201 denotes a communication control unit, which performs control for communicating with the communication control unit 1101 of the server system. The communication control unit 1201 of the policy management server 1200 is configured so as to communicate with multiple information processing devices connected to the network simultaneously.

Reference numeral 1202 denotes a policy management control unit, which performs the integral processing of the policy management server 1200. The policy management control unit 1202 performs processing depending on a command obtained from the communication control unit 1201.

Reference numeral 1203 denotes a policy issuing unit, which creates a policy. Here, the term "policy" is a set of one or more combinations of a user and an access right.

Reference numeral 1204 denotes a database control unit, which creates data to be saved in the policy management database 1205, and performs processing for saving the data in the policy management database 1205. The policy management database 1205 stores information correlating between the ID for determining a document (equivalent to the policy ID in FIG. 3) and a policy, and a key for decoding the document in a correlated manner.

Also, the database control unit 1204 performs processing wherein the corresponding data from the policy management database 1205 is extracted according to an external request, and the data is transmitted to the client 1000 or the document server 1100.

Reference numeral 1205 denotes a policy management database, which is a database where policies and the user information managed by the policy management server are saved.

With the document management system thus configured, the document management apparatus (document server 1100) includes a document database (volume database 1107). The document management apparatus communicates with one of the server devices managing the access right of a user regarding the document information encrypted and registered in the volume database 1107, and controls a document processing request requested from the client 1000. The term "server devices" include the policy management server 1200, and other policy management servers in which access right obtaining destinations are registered.

The document server 1100 includes the attribute database 1108 capable of storing attribute information for determining user authentication information, access right, and so forth to create an index for subjecting document information to full-text search. In an embodiment, the attribute information includes determination destination information for determining an access right management destination (such as policy management server information 36 shown in FIG. 3).

Also, the document server 1100 includes an obtaining function for obtaining access right information from the policy management server 1200. Specifically, such as shown in the steps of a later-described flowchart, upon receiving a full-text search request from the client 1000, the following processing is performed. That is to say, the document server 1100 includes an obtaining function for obtaining access right information from the policy management server 1200 in accordance with the policy management information 36 determined from the attribute database based on the user authentication information obtained from the client 1000.

The document server 1100 also includes a setting function for setting the access right information for each user regarding a document which is obtained from the policy management server 1200 to the attribute database 1108.

The document server 1100 further includes a document decoding function for decoding a document of which access is permitted, of the documents encrypted and registered based on the user authentication information stored in the attribute database 1108. Note that for the encryption algorithm of a document, various types of algorithms can be employed.

Also, the document server 1100 includes an obtaining function for obtaining full-text search information (index) from the decoded document information, and a registration function for registering the obtained full-text search information in the full-text search database 1109.

Also, the document server 1100 includes a determination function for determining the validity of the access right for each user who performs full-text search based on the policy obtained from the policy management server 1200. Additionally, the document server 1100 includes a restriction function for restricting an access request regarding the document information, on which the user has no access right, stored in the attribute database 1108 based on the determination result thereof. Thus, the document server 1100 can execute full-text search as to the encrypted document in accordance with an access right while performing access right management based on a policy.

Also, the document server 1100 includes a notification function for notifying the client 1000 of the search result display information for displaying on a display unit a list of document information, on which a user serving as a search request origin has access rights, stored in the attribute database 1108.

In an embodiment, access rights are made up of multiple hierarchical structures, and are arranged so as to set various rights such as a deletion right, a writing right, a reading right, and a reference right, for example.

Also, the attribute information stored in the attribute database 1108 is arranged so as to set status information for managing the registration status of the full-text search information (see the full-text search information registration status 38 shown in FIG. 3) as to the full-text search database 1109.

Further, with regard to the attribute information, an arrangement is made wherein the registration of full-text search information as to the full-text search database 1109, and obtaining of the registered full-text search information are performed asynchronously.

Figure 2:
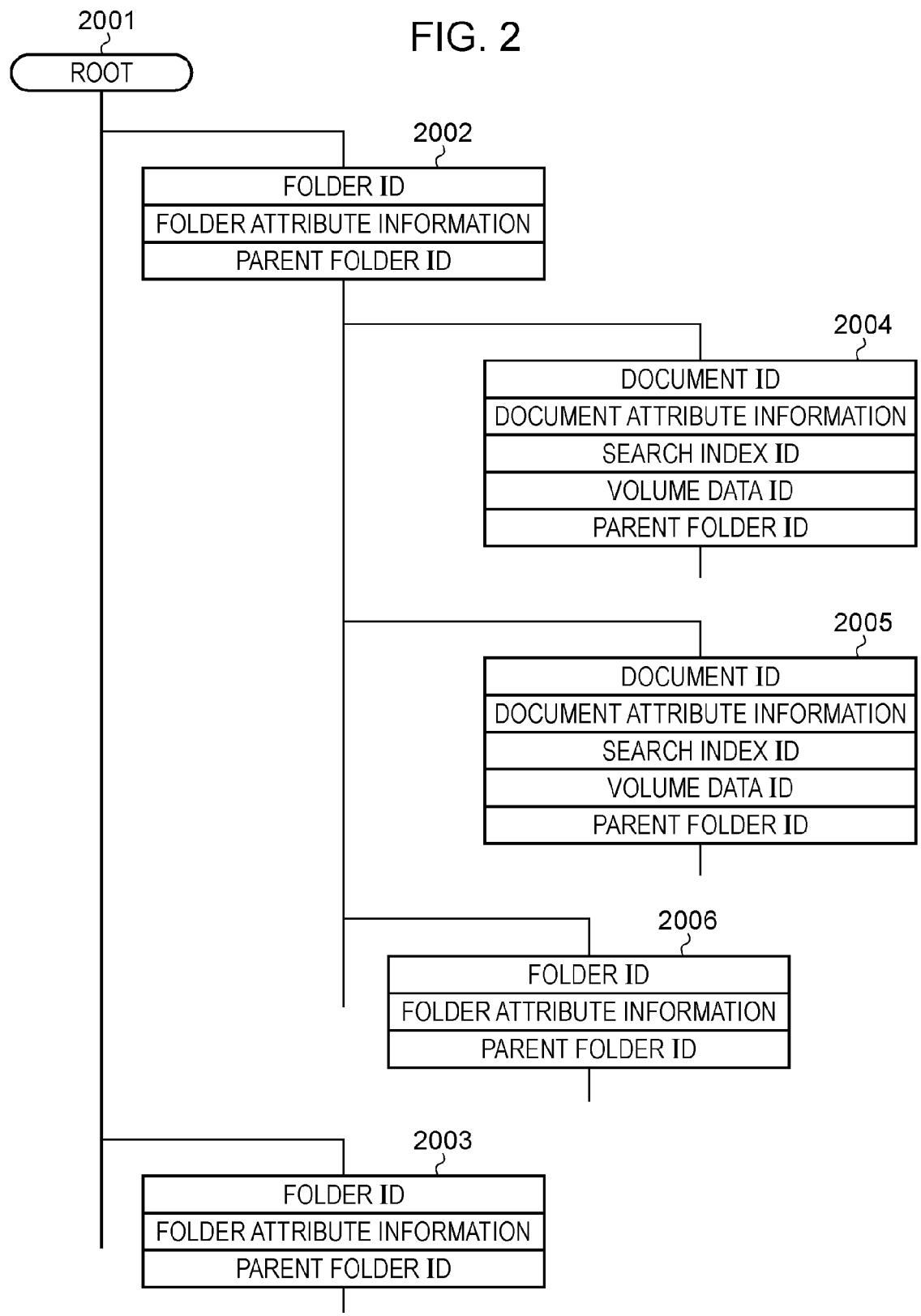
FIG. 2 is a diagram showing an exemplary data structure of information relating to documents registered in the attribute database illustrated in FIG. 1.

FIG. 2 is a diagram showing an exemplary data structure of the information relating to a document registered in the attribute database 1108 illustrated in FIG. 1. In FIG. 2, reference numeral 2001 denotes a root, which serves as an index for determining the data to be managed at the attribute database 1108. All of the data registered within the attribute database 1108 is child data of the root 2001.

Reference numeral 2002 is folder data, which is the data of a folder for a user storing data in the document server 1100. The folder 2002 includes a folder ID, folder attribute information, and a parent folder ID.

Note that with the present embodiment, multiple folders can be provided, so folders existing in the most significant class, which are equivalent to the number thereof, are registered as child data connected to immediately following the root 2001 such as the folder 2003. Therefore, the parent folder of the folders 2002 and 2003 is the root 2001. Also, the parent folder of the folder 2006 is the folder 2002.

Reference numeral 2004 denotes document data, which exists as the child data to be stored in the folder 2002. The document data 2004 includes a document ID, document attribute information, a search index ID, a volume data ID, and a parent folder ID, and saves data as document attribute information, such as a document name, update date and time, remark data, and so forth.

A document ID is an ID appended to a document, and is a value unique to the entire document management system. A search index ID is an ID employed for the full-text database distinguishing documents, and upon causing the database control unit 1106 to search a search index ID by specifying a keyword, the search index ID of the relevant document is returned.

A volume data ID is an ID registered in the volume database, and the information relating to a document can be extracted from each of the databases using this ID. A plurality of document data can exist under a folder, so the number of document data equivalent to the number thereof can be registered such as the document data 2005. A parent folder ID is information indicating the ID of the folder in which the relevant document is stored. For example, the parent folder of the document data 2004 is the folder ID of the folder 2002.

FIG. 3 is a diagram showing an example of the document attribute information stored in the attribute database 1108 illustrated in FIG. 1. An access right administrator for each document, an access right ID, policy management server information, a policy ID, and the cache of the access right information of the RMS are also saved in the attribute database 1108. Therefore, various types of information are managed with the following data structure.

In FIG. 3, reference numeral 31 denotes a document ID. Reference numeral 32 denotes a parent folder, where an upper class folder ID is set. A document name 33 is the document name of a document. An access right administrator 34 is information serving as the main body for controlling the access right as to a document, and here takes one of a value of "document management system" and a value of "policy management server".

An access right ID 35 is information for determining an access right which is managed and set within the document management system in the event that the access right as to a document is controlled by the document management system.

Policy management server information 36 is an IP address as to the network of the policy management server 1200 in the event that the access right as to a document is controlled by using the external policy management server 1200.

A policy ID 37 is a unique ID for determining a document within the relevant policy management server in the event that the access right as to the document is determined with the policy management server information 36, i.e., the policy management server.

A full-text information registration status 38 is information regarding whether or not the full-text search information generated regarding the document information decoded by the document management control unit 1102 is registered in the full-text search database 1109, and for example, either "registered" or "unregistered" is set. Here, the term "full-text search information" is index information for search, and is encrypted and registered in the volume database 1107 by the document management control unit 1102. The full-text search information is decoded in accordance with a user authentication and the access right of an authenticated user, following which is generated as to the decoded document information.

FIG. 4 is a diagram showing one example of the access right information stored in the attribute database 1108 illustrated in FIG. 1. In FIG. 4, reference numeral 41 denotes an access right ID. Reference numeral 42 is a user ID. The user ID 42 is an ID for uniquely determining a user within the document management system. An access right 43 as to a document is referenced by the document management system in the event that control is performed by the document management system.

In an embodiment, the access right 43 is made up of four types of a deletion right, a writing right, a reading right, and a reference right, and the access right of each type is strong in this order. A strong access right includes a weak access right. For example, including a deletion right means including a writing right, a reading right, and a reference right. Also, including a writing right means including a reading right and a reference right.

Note that with the present embodiment, in the event that there is no combination of the access right ID 41 and the user ID 42 in the access right information, management is performed assuming that this user has no access right regarding the document appended with the access right ID.

FIG. 5 is a diagram showing one example of the cache of the policy management server 1200 stored in the attribute database 1108 illustrated in FIG. 1. In FIG. 5, the present illustrated cache includes a user ID 51, policy management server information 52, a policy ID 53, and an access right 54.

The user ID 51 is an ID for uniquely identifying a user within the document management system, as with the user ID 41 in FIG. 4.

The present cache is a partial copy of the policy stored in the policy management server 1200 (or another policy management server), and is added and managed by the database control unit 1106 each time the policy data processing unit 1105 obtains a policy from the policy management server. Also, in the event that modification of a policy is informed from the policy management server 1200, the policy data processing unit 1105 deletes the cache of the corresponding policy stored on the attribute database 1108. In the event that the contents of the modified policy are informed from the policy management server 1200 as well, the policy following modification may be cached.

FIG. 6 is a diagram showing one example of authentication information as to the policy management server 1200 saved in the internal data saving unit 1103 illustrated in FIG. 1. Note that the present authentication information is referenced at the time of full-text search information obtaining processing and at the time of search processing.

In FIG. 6, a user ID 61 is, as with the user ID 41 in FIG. 4, an ID for uniquely identifying a user within the document management system. Policy management server information 62 is information for determining the policy management server 1200 (or another policy management server). There are a case wherein authentication information 63 is stored as a credential 64, and a case wherein it is stored as a pair of a user name 65 and a password 66. Also, in the event that a user has not performed user authentication using the policy management server 1200 or the like, information such as "unauthenticated" is input to the authentication information 63.

With the example shown in FIG. 6, the document management control unit 1102 manages the password 66 as another item different from the credential 64, but the document management control unit 1102 may manage the password 66 as one of the credential 64.

In the event of storing the authentication information 63 as the credential 64, the expiration date 67 of the authentication information 63 is controlled by the policy management control unit 1202 of the policy management server 1200.

On the other hand, in the event of storing the authentication information 63 as a pair of the user name 65 and the password 66, the expiration date 67 of the authentication information 63 is controlled by the document management control unit 1102 of the document management system.

With the present embodiment, the credential 64 is some kind of information employed in the case of a user performing authentication as to the policy management server 1200. Examples of a credential include information for certificating the relevant user, and an encryption key or signature information employed in the case of performing a session for authentication as to the policy management server 1200.

Note that the document management control unit 1102 adds information to the present information saved in the internal data saving unit 1103 at the point of authentication as to the policy management server 1200 succeeding. Also, the document management control unit 1102 deletes the relevant information at the point of the authentication becoming invalid.

FIG. 7 is a diagram showing an example of a full-text search information obtaining range for each user that is saved in the attribute database 1108 illustrated in FIG. 1. The present information is used for preventing a document, that a user does not intend to be included in search results, from being included in search results, and is referenced in full-text search information registration processing by the document management control unit 1102.

In FIG. 7, a user ID 71 is, as with the user ID 41 in FIG. 4, an ID for uniquely identifying a user within the document management system. A full-text search information obtaining range 72 can be set for each user of the document management system, and is saved and managed in a correlation with the user ID 71.

In an embodiment, the full-text search information obtaining range 72 is any one of "all permitted", "partially permitted", and "all denied".

Here, "all permitted" is set in the case of permitting acquisition and registration of full-text search information regarding all of the documents that the user has the access rights 43 shown in FIG. 4.

Also, "partially permitted" is set in a case wherein the user specifies a permission range for each document or each folder, and the document management system records the specified range in the permission range 73 as a document ID group or folder ID group.

Further, "all denied" is set in the case of not permitting acquisition and registration of full-text search information regarding all of the documents that the user has the access rights.

Figure 8:
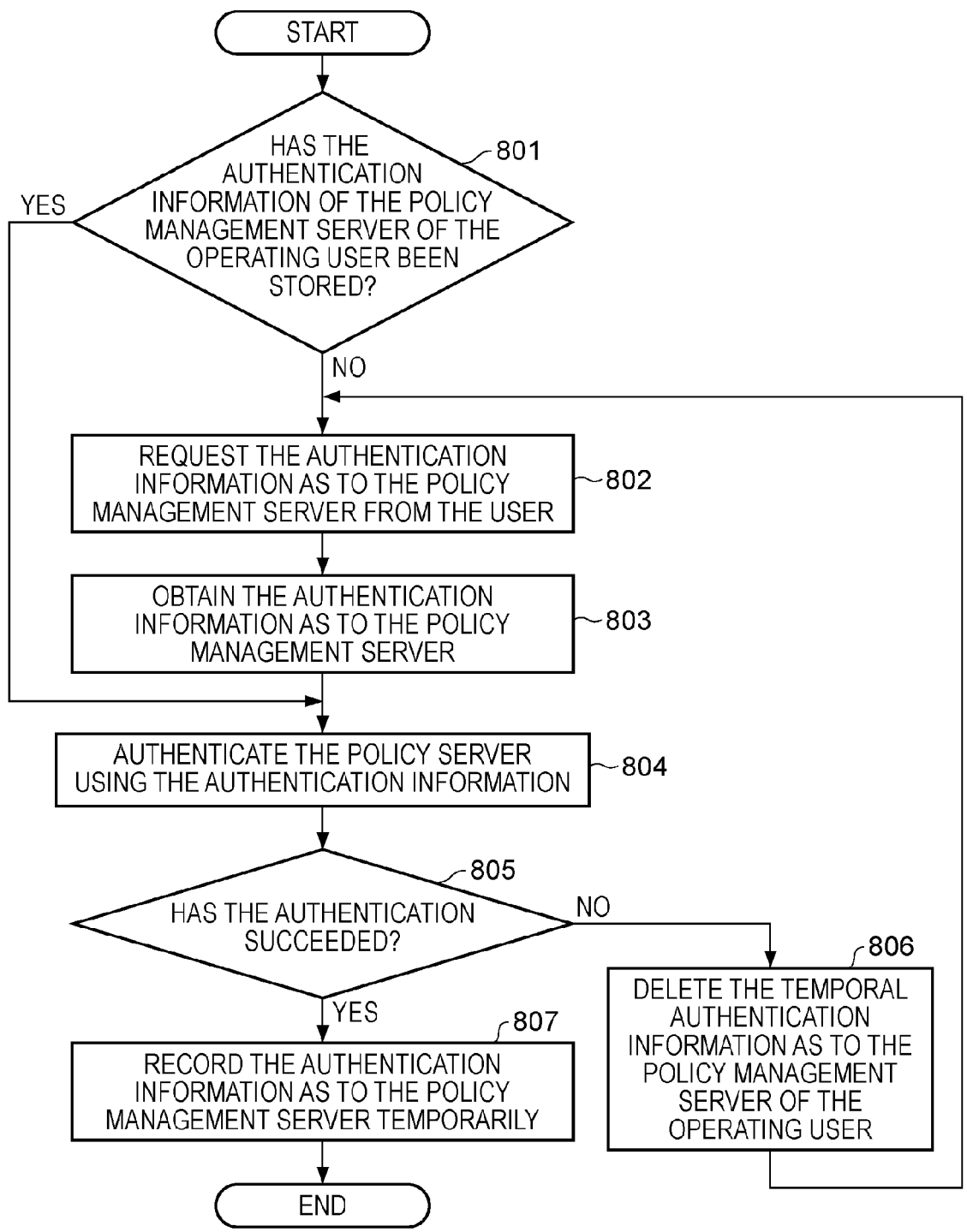
FIG. 8 is a flowchart illustrating one example of a first data processing procedure executed in the document management apparatus according to an embodiment.

FIG. 8 is a flowchart illustrating one example of a first data processing procedure executed in the document management system according to an embodiment. The present processing corresponds to an authentication processing procedure as to the policy management server 1200 via the document management system.

Also, the present processing is performed in the case of confirming the access right of a document of which access right is managed using the RMS, stored on the document management system. Following the present processing, processing such as obtaining access right information or the like is performed. Note that reference numerals (801) through (807) represent the respective steps. Also, the respective steps in FIG. 8 describe the processing performed by the client 1000 and the document server 1100, but the processing performed by other than the document management system will be described later.

First, in step (801), the document management control unit 1102 determines whether or not the authentication information at the policy management server 1200 relating to the operating user is stored in the internal data saving unit 1103. Now, if the document management control unit 1102 determines that the authentication information is stored on the internal data saving unit 1103, the flow proceeds to step (804).

On the other hand, if the document management control unit 1102 determines in step (801) that the authentication information is not stored on the internal data saving unit 1103, the flow proceeds to step (802).

Note that the present step (801) and later-described steps (806) and (807) are steps for reducing the number of times authentication information requests are issued to the user, and improving convenience of the user.

In step (802), the document management control unit 1102 requests authentication information as to the policy management server 1200 from the user via the communication control unit 1101. This request is ultimately propagated to the user interface unit 1001 of the client 1000 to seek authentication information from the user.

On the other hand, the user operates an input device on the client 1000, and from a displayed UI screen inputs authentication information as to the policy management server 1200.

Subsequently, in step (803), the user interface unit 1001 of the client 1000 obtains the authentication information as to the policy management server 1200 from the user, and propagates the authentication information to the policy data processing unit 1105 via the communication control units 1008 and 1101.

Next, in step (804), the policy data processing unit 1105 inquires of the policy management server 1200 the access right as to the operating user regarding the document. This is performed by inquiring of the policy management server 1200 via the communication control unit 1101.

At this time, an inquiry is made with the authentication information input from the client 1000 in step (803), or with the authentication information obtained from the internal data saving unit 1103 in step (801).

The policy management server 1200 receives the above authentication information, performs authentication processing with reference to the policy management database 1205, and replies the result thereof to the document server 1100.

Subsequently, in step (805), the document management control unit 1102 determines whether or not the authentication has succeeded with respect to the inquiry in step (804). Subsequently, in the event that the document management control unit 1102 determines that the authentication has succeeded, the flow proceeds to step (807), but in the event of determining that the authentication has not succeeded, the flow proceeds to step (806).

In step (806), in the event that the authentication information of the policy management server 1200 of the operating user is registered on the internal data saving unit 1103, the document management control unit 1102 deletes the authentication information, and the flow returns to step (802).

Thus, with regard to the existing authentication information, authentication processing is prevented by the authentication information being determined to be wrong in step (805), thereby improving processing efficiency.

On the other hand, in the event that the document management control unit 1102 determines in step (805) that the authentication has succeeded, in step (807) the document management control unit 1102 newly records the authentication information of the policy management server 1200 on the internal data saving unit 1103, and the present processing ends.

Note that in the event that the authentication information has been already recorded, this processing may be omitted.

FIG. 9 is a flowchart illustrating one example of a second data processing procedure executed in the document management apparatus according to an embodiment. The present processing is a basic processing example of the full-text search information registration processing. Also, the present processing is performed following the authentication processing in FIG. 8, but is performed during a period in a state wherein the relevant user is authenticated, separately from the document processing that the user originally intends to execute following the authentication processing in FIG. 8 (e.g., processing such as displaying the document information that the user specifies, or newly registering document information, or the like).

The document information of which access right is managed by the policy management server 1200 is encrypted, so in the event of a period wherein the user is authenticated by the document server 1100, the decoding key of such encrypted document information can be obtained from the policy management server using the credential information of the relevant user (it is needless to say that the policy that can access to the relevant document is assumed to have been applied). Thus, it is not necessary for the user to instruct to generate an index, and the document server 1000 can automatically perform index generation of the document information of which access right is managed by the policy management server 1200.

First, in step (901), the document management system obtains the authentication information as to the policy management server 1200 of the user temporarily stored in the internal data saving unit 1103. Subsequently, the following processing from step (902) to step (911) is repeated for each of authentication information as to the policy management server 1200.

In step (902), the document management control unit 1102 of the document server 1100 obtains the full-text information obtaining permission range 72 based on the user ID 71 of the user saved in the attribute database 1108 illustrated in FIG. 1. Subsequently, the document management control unit 1102 determines whether the full-text information obtaining permission range 72 is "all permitted" or "partially permitted".

In the event that the document management control unit 1102 determines that the full-text search information obtaining permission range 72 is "all permitted" or "partially permitted", the flow proceeds to step (903), and in the event of determining that the full-text search information obtaining permission range 72 is "all denied", the flow proceeds to step (911).

Subsequently, in step (903), the document management control unit 1102 obtains a document ID group of the documents included in the user permission range 73, and repeats the processing from step (904) to step (910) regarding each of the documents.

Next, in step (904), the document management control unit 1102 obtains the full-text search information registration status of one of the documents to which the obtained ID is set, here obtains the full-text search information registration status 38 stored in the attribute database 1108 illustrated in FIG. 3. Subsequently, the document control unit 1102 determines whether or not the full-text search information registration status 38 thereof is "registered".

Now, in the event that "registered" is determined by the document management control unit 1102, the flow proceeds to step (910), where processing regarding the next document is performed, but in the event of "unregistered" being determined, the flow proceeds to step (905).

Next, in step (905), the document management control unit 1102 transmits the authentication information as to the policy management server 1200 obtained in step (901), and the policy ID 37 of the document determined as "unregistered" to the policy management server 1200, and receives the decoding key for decoding the document from the policy management server 1200. An arrangement may be made wherein in step (905), the access right information as to the document to be decoded with the decoding key thereof is further received from the policy management server 1200.

Subsequently, in step (906), the document management control unit 1102 determines whether or not decoding of the document information using the decoding key received from the policy management server 1200 has succeeded. However, if the relevant user has no access right higher than a reference authority regarding the document information determined by the policy ID 37 transmitted to the policy management server 1200, or if the policy management server 1200 includes no policy of the relevant document information, the decoding key is not transmitted from the policy server. In such a case, the document information cannot be decoded, and accordingly, in step (906) determination is made that decoding has failed. On the other hand, if the policy wherein the relevant user has the access right of reference authority transfer is applied to the document information specified by the relevant policy ID 37, determination can be made that decoding of the relevant document information can be performed, and the subsequent index generating processing can be performed. In other words, in the event that the decoding key is transmitted from the policy management server, it can be also considered that the information indicating that there is the access right as to the relevant document is received. Now, if the document management control unit 1102 determines that decoding has succeeded, the flow proceeds to step (907), but in the event of determining that decoding has been failed, the flow proceeds to step (910), where processing regarding the next document is performed.

Next, in step (907), the document management control unit 1102 of the document management system obtains full-text search information (index) from the decoded document, and registers the full-text search information in the full-text search database 1109 (908). The full-text search information is the keyword employed for full-text search, which is extracted from the text portion of a document. Subsequently, the document management control unit 1102 changes the full-text search information registration status 38 managed by the attribute database 1108 as to the relevant policy ID 37 to "registered" (909).

The document management control unit 1102 repeats the above processing from step (903) to step (909) regarding the documents included in the full-text search information obtaining permission range 72 of the user (910).

Subsequently, the document management control unit 1102 repeats the processing from step (902) to step (910) regarding the authentication information as to the policy management server 1200 of the user temporarily stored in the internal data saving unit 1103 of the document management system, and the present processing ends.

The processing in FIG. 9 enables the full-text search information of the encrypted document to be obtained using the authentication information as to the policy server temporarily stored. Thus, it becomes unnecessary for the user to perform operations for authentication as to the policy server to obtain full-text search information, whereby convenience in the case of obtaining full-text search information from a document improves.

FIG. 10 is a flowchart illustrating one example of a third data processing procedure executed in the document management apparatus according to an embodiment. The present processing is a document search processing example of the present system. Note that reference numerals (1001) through (1014) denote the respective steps. The present flowchart starts based on a search request from the client 1000.

In step (1001), the document management system inquires search conditions of the user. The user inputs search conditions from the client 1000 via the user interface unit 1001. The document management control unit 1006 of the document management system receives the response thereof via the user interface unit 1001, and stores the search conditions in the memory or the temporary data 1003.

Next, in step (1002), the document management control unit 1006 of the document management system inquires of the document server 1100 the document that matches the search conditions stored on the above memory. This can be realized by performing the following processing.

For example, the database control unit 1106 searches the document matching the above search conditions from the full-text search database 1109, and returns a search index ID group. Here, the document management control unit 1102 converts a search index ID into the corresponding document ID, and stores this information in the internal data saving unit 1103. Hereafter, the document ID group stored in the internal data saving unit 1103 is referred to as search results.

The document management system performs the processing of step (1004) through (1013) regarding each of the documents included in the search results. Specifically, in step (1004), the document management control unit 1102 determines whether the access right administrator of a document is the policy management server 1200 or the document management system.

Now, if the document management control unit 1102 determines that the access right administrator is the policy management server 1200, the flow proceeds to step (1006). On the other hand, if the document management control unit 1102 determines that the access right administrator is the document management system, the flow proceeds to step (1005).

Subsequently, in step (1005), the document management control unit 1102 of the document management system searches the attribute database 1108, and obtains the access right of the operating user as to the document.

Note that step (1006) through step (1011) are the processing in a case wherein the access right as to the document is managed by the policy management server 1200.

First, in step (1006), the document management control unit 1102 of the document management system obtains the policy management server information 52 and policy ID 53 that manage the document access right 54 shown in FIG. 5.

Subsequently, in step (1007), the document management control unit 1102 of the document management system determines whether or not the access right information of the operating user as to the policy ID 53 is cached on the internal data saving unit 1103. Now, in the event that the document management control unit 1102 determines that the cache of the access right information exists, the document management control unit 1102 obtains the access right information thereof, and the flow proceeds to step (1012), but in the event of determining that there is no cache, the flow proceeds to step (1008).

Subsequently, in step (1008), with the document management system, the document management control unit 1102 determines whether or not the authentication information 63 as to the policy management server 1200 of the operating user temporarily stored on the internal data saving unit 1103 is valid.

Now, in the event that the document management control unit 1102 determines that the authentication information 63 is valid, the flow proceeds to step (1010).

On the other hand, in the event that invalidity is determined by the document management control unit 1102, in step (1009) the document management control unit 1102 obtains the authentication information as to the policy management server 1200 to perform the authentication processing as to the policy management server 1200 illustrated in FIG. 8.

The policy data processing unit 1105 of the document management system inquires of the policy management server 1200 the access right appended with the authentication information and policy ID. The policy management server 1200 returns the access right information correlated with the relevant user, of the policies managed with a policy ID. The policy data processing unit 1105 of the document management system receives the access right information from the policy management server 1200 (1010). Subsequently, the document management control unit 1102 of the document management system additionally registers the access right received from the policy management server 1200 on the cache on the internal data saving unit 1103 (1011).

Next, in step (1012), with the document management system, the document management control unit 1102 determines whether or not the access right as to the document that obtained in step (1005) or (1007) or (1010) is equal to or greater than the "reading right" shown in FIG. 5.

Now, if the document management control unit 1102 determines that the access right as to the document is less than the "reading right", the document management control unit 1102 removes the ID of the relevant document from the search results (1013). The document management control unit 1102 repeats the above processing regarding each of the documents included in the search results (1014). Subsequently, in step (1015), the document management control unit 1102 of the document management system informs the client 1000 about the search results. Thus, the device control unit 1003 included in the client 1000 displays the search results on the display device via the user interface unit 1001 of the client 1000 to have the user confirm the search results, and the present processing ends.

Thus, with the document management apparatus, access rights are managed at the external policy management server, and full-text search can be performed even regarding a document stored in an encrypted state.

Also, only the documents that a user, who searched documents, can access are displayed as search results, whereby security and user convenience can be improved.

Second Embodiment

With the above embodiment, in the event that the policy regarding a document is managed at the policy management server 1200, the authority thereof and so forth may be modified in some cases.

Now, in the event that the document management control unit 1102 receives a policy modification notice from the policy management server 1200, the policy data processing unit 1105 performs the following processing.

The policy data processing unit 1105 deletes the access right information of the policy corresponding to the received policy modification notice. Specifically, the policy data processing unit 1105 deletes the access right and so forth within the attribute database 1108 with reference to the user ID and so forth.

Also, in the event that the contents of the policy after modification are also informed from the policy management server 1200, the access right information may be overwritten by the access right information stipulated by the policy after modification.

Thus, the document search processing adapted to the newest access rights can be performed.

Third Embodiment

Description will be made below regarding the structure of a data processing program that can be read by the document management apparatus according to the present invention with reference to the memory map illustrated in FIG. 11.

FIG. 11 is a diagram illustrating the memory map of a storing medium storing various types of data processing programs that can be read by the document management apparatus according to an embodiment of the present invention.

Note that though not particularly shown in the drawing, information managing a program group stored in the storing medium, for example, such as version information, a creator, and so forth is stored, and also information depending on the OS or the like at the program readout side, for example, such as icons for displaying programs in a distinguishable manner, and so forth is stored in some cases.

Further, data belonging to various types of programs is also managed in the above directory. Also, in the event that a program for installing various types of programs in a computer, and programs to be installed are compressed, a decompression program or the like is also stored in some cases.

The functions illustrated in FIG. 8 according to the present embodiment may be executed by a host computer using a program to be externally installed. In this case, even in the event that an information group including programs is supplied to an output device from a storing medium such as CD-ROM, flash memory, FD, or the like, or from an external storing medium via a network, the present invention can be applied.

As described above, a storing medium in which the program code of software for realizing the functions of the above embodiments is recorded is supplied to a system or device. Subsequently, it is needless to say that the functions of the present invention can be provided by the computer (or CPU or MPU) of the system or device thereof reading out and executing the program code stored in the storing medium.

In this case, consequently, the program code itself read out from the storing medium realizes the new functions of the present invention, and accordingly, the storing medium storing the program code thereof makes up the present invention.

Accordingly, as long as the functions of the program are included, any form of a program such as an object code, a program executed by an interpreter, script data supplied to the OS, and so forth, can be employed.

As for a storing medium for supplying the program, for example, a flexible disk, a hard disk, an optical disc, a magneto-optical disk, MO, CD-ROM, CD-R, CD-RW, magnetic tape, nonvolatile memory, ROM, DVD, and so forth, can be employed.

In this case, the program code itself read out from a storing medium realizes the functions of the above embodiments, and accordingly, the storing medium storing the program code thereof makes up the present invention.

In addition, as for a method for supplying the program, the program can be supplied by an arrangement wherein the client computer is connected to a home page of the Internet using a browser of the client computer, and subsequently, the computer program itself of the present invention, or a compressed file including an automatic install function is downloaded in a storing medium such as a hard disk or the like from the home page. Also, the program code making up the program of the present invention is divided into multiple files, and each of the files is downloaded from a different home page, whereby the program can be supplied. In other words, a WWW server or a ftp server or the like for downloading the program file for realizing the functional processing of the present invention at a computer to multiple users are also encompassed in the claims of the present invention.

Also, an arrangement may be made wherein the program of the present invention is encrypted and stored in a storing medium such as CD-ROM or the like to distribute this to users, and only the user satisfying predetermined conditions can download the key information for decoding the encryption from a home page via the Internet, and subsequently, execute the encrypted program using the key information thereof to be installed in a computer, whereby the functional processing of the present invention can be realized.

Also, the functions of the above embodiments may be realized not only by executing the program code that the computer reads out, but also by the OS or the like running on the computer performing a part or all of the actual processing based on the instruction of the program code thereof, for example, and it is needless to say that the case of the functions of the above embodiments being realized by the processing thereof is also encompassed in the present invention.

Further, the program code read out from a storing medium may be written in the memory included in a function expansion board inserted in the computer, or a function expansion unit connected to the computer, following which the CPU or the like included in the function expansion board or function expansion unit thereof performs a part or all of the actual processing, and it is needless to say that the case of the functions of the above embodiments being realized by the processing thereof is also encompassed in the present invention.

According to the present invention, encrypted and stored document information is disposed in a document management apparatus which can manage user rights at a management server, and the documents of which access rights are managed can be decoded, whereby full-text search can be performed.

Also, only the documents that the user who searched can access are displayed as search results, whereby security and user convenience can be improved.

The present invention is not restricted to the above embodiments, so various types of modification (including an organic combination of the respective embodiments) based on the meaning of the present invention can be made, which are not eliminated from the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-082138 filed Mar. 24, 2006, which is hereby incorporated by reference herein in its entirety.

What is claimed is:

1. A document management apparatus including a processor, comprising:

a document information storing unit configured to use the processor to store document information, the document information storing unit being capable of storing a first type of document information and a second type of document information, wherein an access right of the second type of document information is managed by an access right management apparatus which is located external to the document management apparatus, and the second type of document information has been encrypted by a key managed by the access right management apparatus, and wherein an access right of the first type of document information is not managed by the access right management apparatus, and the first type of document information has not been encrypted;

a managing unit configured to manage the access right of the first type of document information stored in the document information storing unit;

an index generating unit configured to perform processing for generating an index of document information stored in the document information storing unit, wherein the index generating unit is not capable of generating the index from the second type of document information which is encrypted;

a user identification accepting unit configured to accept user identification information for identifying a user;

a sending unit configured to send, to the access right management apparatus, the user identification information and information for identifying document information of which index generating processing has not been performed by the index generating unit from among the second type of document information stored in the document information storing unit;

a receiving unit configured to receive, in a case where a user, who is identified by the user identification information sent by the sending unit, has an access right of the second type of document information identified by the information sent by the sending unit, the key of the document information from the access right management apparatus;

a control unit configured to control the index generating unit to decrypt the second type of document information and to generate the index of the second type of document information when the key of the second type of document information is received by the receiving unit;

an index storing unit configured to store an index generated by the index generating unit; and an index storing status storing unit configured to store an index storing status indicating a state whether or not the index of each of one or more document information stored in the document information storing unit is stored in the index storing unit, wherein the sending unit refers to the index storing status storing unit, and sends information determining document information of which index generation by the index generating unit has not been performed to the access right management apparatus, and wherein the index storing status storing unit stores the index storing status relating to the document information of which index has been generated by the index generating unit as index stored.

2. The document management apparatus according to claim 1, wherein the receiving unit further receives access right information of the user corresponding to the second type of document information, from the access management apparatus, and wherein the control unit determines index generating processing by the index generating unit to be executable based on the access right information if the user has a reference right regarding the second type of document information.

3. The document management apparatus according to claim 2, wherein the control unit determines index generating processing by the index generating unit to be inexecutable based on the access right information if the user has no right necessary for index generation regarding the second type of document information.

4. The document management apparatus according to claim 1, further comprising:

a document information processing unit configured to process the first type or the second type of document information stored by the document information storing unit; and a document specification accepting unit configured to accept specification of the first type or the second type of document information to be processed by the document information processing unit, of one or more document information stored by the document information storing unit;

wherein the index generating unit perform index generation regarding the second type of document information stored in the document information storing unit other than the document information to be processed by the document processing unit that is accepted by the document specification accepting unit.

5. A method for storing document information using a document management apparatus having a document information storing unit, the method comprising:

storing a first type of document information and a second type of document information, wherein an access right of the second type of document information is managed by an access right management apparatus which is located external to the document management apparatus, and the second type of document information has been encrypted by a key managed by the access right management apparatus, and wherein an access right of the first type of document information is not managed by the access right management apparatus, and the first type of document information is not encrypted;

managing the access right of the first type of document information stored in the document information storing unit;

performing processing for generating an index of document information stored in the document information storing unit, wherein generating the index from the second type of document information which is encrypted is not possible;

receiving user identification information for identifying a user;

sending to the access right management apparatus the user identification information, and information for identifying document information of which index generating processing has not been performed from among the second type of document information stored in the document information storing unit;

receiving, in a case where a user, who is identified by the user identification information, has an access right of the second type of document information identified by the information sent, the key of the document information from the access right management apparatus;

decrypting the second type of document information and generating the index of the second type of document information when the key of the second type of document information is received;

storing an index generated in an index storing unit; and storing an index storing status indicating a state whether or not the index of each of one or more document information stored in the document information storing unit is stored in the index storing unit;

wherein the sending step refers to the index storing status, and sends information determining document information of which index generated has not been performed to the access right management apparatus;

and wherein the stored index storing status relating to the document information of which index has been generated as index stored.

6. A non-transitory storage medium storing a program for storing document information using a document management apparatus having a document information storing unit, the document management method comprising:

storing a first type of document information and a second type of document information, wherein an access right of the second type of document information is managed by an access right management apparatus which is located external to the document management apparatus, and the second type of document information has been encrypted by a key managed by the access right management apparatus, and wherein an access right of the first type of document information is not managed by the access right management apparatus, and the first type of document information is not encrypted;

managing the access right of the first type of document information stored in the document information storing unit;

performing processing for generating an index of document information stored in the document information storing unit, wherein generating the index from the second type of document information which is encrypted is not possible;

receiving user identification information for identifying a user;

sending to the access right management apparatus, the user identification information and information for identifying document information of which index generating processing has not been performed from among the second type of document information stored in the document information storing unit;

receiving, in a case where a user, who is identified by the user identification information, has an access right of the second type of document information identified by the information, the key of the document information from the access right management apparatus;

decrypting the second type of document information and generating the index of the second type of document information when the key of the second type of document information is received;

storing an index generated in an index storing unit; and storing an index storing status indicating a state whether or not the index of each of one or more document information stored in the document information storing unit is stored in the index storing unit;

wherein the sending step refers to the index storing status, and sends information determining document information of which index generated has not been performed to the access right management apparatus;

and wherein the stored index storing status relating to the document information of which index has been generated as index stored.

* * * * *